(12) United States Patent
Guo et al.

(10) Patent No.: US 12,153,260 B2
(45) Date of Patent: Nov. 26, 2024

(54) WAVELENGTH DIVISION MULTIPLEXER AND SILICON PHOTONIC INTEGRATED CHIP

(71) Applicant: InnoLight Technology (Suzhou) Ltd., Suzhou (CN)

(72) Inventors: De-Fen Guo, Suzhou (CN); Xian-Yao Li, Suzhou (CN)

(73) Assignee: InnoLight Technology (Suzhou) Ltd., Suzhou (CN)

( * ) Notice: Subject to any disclaimer, the term of this patent is extended or adjusted under 35 U.S.C. 154(b) by 210 days.

(21) Appl. No.: 17/891,818

(22) Filed: Aug. 19, 2022

(65) Prior Publication Data
US 2022/0390678 A1 Dec. 8, 2022

Related U.S. Application Data

(63) Continuation of application No. PCT/CN2021/075297, filed on Feb. 4, 2021.

(30) Foreign Application Priority Data
Mar. 17, 2020 (CN) .......................... 202010184838.6

(51) Int. Cl.
*G02B 6/293* (2006.01)
*H04J 14/02* (2006.01)
*H04J 14/06* (2006.01)

(52) U.S. Cl.
CPC ....... *G02B 6/29352* (2013.01); *G02B 6/2938* (2013.01); *G02B 6/29397* (2013.01); *H04J 14/02* (2013.01); *H04J 14/06* (2013.01)

(58) Field of Classification Search
CPC .............. G02B 6/29352; G02B 6/2938; G02B 6/29397; G02B 6/2766; G02B 6/2793;
(Continued)

(56) References Cited

U.S. PATENT DOCUMENTS

| 9,557,482 B2 | 1/2017 | Oka et al. | |
|---|---|---|---|
| 2002/0048443 A1* | 4/2002 | Itoh | G02B 6/136 385/132 |
| 2019/0007157 A1* | 1/2019 | Anderson | H04J 14/02 |

FOREIGN PATENT DOCUMENTS

| CN | 105408786 A | 3/2016 |
|---|---|---|
| CN | 108227084 A | 6/2018 |

(Continued)

OTHER PUBLICATIONS

WIPO, International Search Report issued on May 8, 2021.

*Primary Examiner* — John Bedtelyon
(74) *Attorney, Agent, or Firm* — Li & Cai Intellectual Property (USA) Office

(57) ABSTRACT

A silicon photonic integrated chip and a wavelength division multiplexer that includes at least two polarization control structures and at least one polarization-independent Mach-Zehnder interferometer on a silicon substrate are provided. The polarization control structure includes two input ports and one output port. The Mach-Zehnder interferometer includes two input ports and one optical signal output port for outputting a multiplexed optical signal. The output ports of the polarization control structures are connected to the input ports of the Mach-Zehnder interferometer. The polarization control structures have large bandwidths for increasing an optical bandwidth of the wavelength division multiplexer and reducing an optical loss. A quantity of phase shift arms that require tuning feedback is reduced to lower overall power consumption of the wavelength division multiplexer. Reliability and yields of the wavelength division multiplexer are enhanced due to a large manufacturing tolerance and good stability of the polarization control structures.

10 Claims, 4 Drawing Sheets

(58) Field of Classification Search
CPC .......... G02B 6/29395; G02B 6/29355; G02B 6/29346; H04J 14/02; H04J 14/06
See application file for complete search history.

(56) References Cited

FOREIGN PATENT DOCUMENTS

| | | |
|---|---|---|
| CN | 109946790 A | 6/2019 |
| GB | 2394375 A | 4/2004 |

\* cited by examiner

WAVELENGTH DIVISION MULTIPLEXER AND SILICON PHOTONIC INTEGRATED CHIP

CROSS-REFERENCE TO RELATED PATENT APPLICATION

This application is a continuation application of International Patent Application Ser. No. PCT/CN2021/075297, filed on Feb. 4, 2021, which claims the priority of China Patent Application No. 202010184838.6, filed on Mar. 17, 2020 in People's Republic of China. The entirety of each of the above patent applications is hereby incorporated by reference herein and made a part of this specification.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a technology in the field of optical communications, and more particularly to a wavelength division multiplexer and a silicon photonic integrated chip.

BACKGROUND OF THE DISCLOSURE

An optical communication capacity can be effectively increased through the wavelength division multiplexing technology, in which key devices are a wavelength division multiplexer (MUX) and a wavelength division demultiplexer (DEMUX). The main structure of a planar waveguide-type wavelength division multiplexer includes an array waveguide grating, an etched diffraction grating, and a cascaded Mach-Zehnder interferometer (MZI).

Furthermore, a silicon photonic chip is a key device for realizing optical interconnection, which can effectively reduce module costs in optical communication. Referring to FIG. 1, a conventional silicon-photonic wavelength division multiplexer that has the cascaded Mach-Zehnder interferometer structure is exemplified to perform four-channel wavelength division multiplexing, and three Mach-Zehnder interferometers 10' that are arranged in parallel and in cascade are included therein. Each of the Mach-Zehnder interferometers 10' includes two 2×2 3 dB couplers 11', two connecting arms 12', and one monitor photodetector 13'. Here, one of the connecting arms 12' is a tunable phase shift arm (as indicated by broken lines in the drawing). During use, the monitor photodetector 13' needs to be incorporated for tuning the tunable phase shift arm of each of the cascaded Mach-Zehnder interferometers 10'. However, such a tuning process is inconvenient, and power consumption for the same is large. In addition, an optical bandwidth of the 3 dB coupler 11' is limited, and when a number of the 3 dB couplers 11' are provided on an optical path of the wavelength division multiplexer that includes the multiple cascaded Mach-Zehnder interferometers 10', the performance of the wavelength division multiplexer can be significantly decreased.

SUMMARY OF THE DISCLOSURE

In response to the above-referenced technical inadequacies, the present disclosure provides a wavelength division multiplexer and a silicon photonic integrated chip for which a quantity of phase shift arms is reduced, so as to achieve the effects of low power consumption, a large optical bandwidth, easy tuning, and good stability.

In one aspect, the present disclosure provides a wavelength division multiplexer, which includes at least two polarization control structures and at least one polarization-independent Mach-Zehnder interferometer that are disposed on a silicon substrate. Each of the at least two polarization control structures includes two input ports and one output port, the at least one Mach-Zehnder interferometer includes two input ports and one optical signal output port, the optical signal output port is used for outputting a multiplexed optical signal, and the output ports of the at least two polarization control structures are connected to the input ports of the at least one Mach-Zehnder interferometer. Each of the at least two polarization control structures receives two linearly-polarized light beams of linearly-polarized incident light beams, all the linearly-polarized incident light beams have different wavelengths, the two linearly-polarized light beams are combined and outputted as a sub-multiplexed optical signal in which linear polarization states of the two linearly-polarized light beams are rotated to be perpendicular to each other, and the sub-multiplexed optical signal is inputted through one of the input ports of the at least one Mach-Zehnder interferometer. The at least one polarization-independent Mach-Zehnder interferometer receives the sub-multiplexed optical signals outputted by the at least two polarization control structures, and the sub-multiplexed optical signals are combined and outputted as the multiplexed optical signal which includes two linear polarization states that are perpendicular to each other.

In certain embodiments, the at least two polarization control structures included in the wavelength division multiplexer are n in number, the at least one polarization-independent Mach-Zehnder interferometer included in the wavelength division multiplexer is n−1 in number, and n is an integer that is greater than or equal to 2.

In certain embodiments, each of the at least two polarization control structures is an integrated polarization rotator-combiner.

In certain embodiments, the integrated polarization rotator-combiner includes a straight-through waveguide, a cross waveguide, a straight-through port and a cross port that are respectively connected to the straight-through waveguide and the cross waveguide, and a mode conversion structure that is connected to the straight-through waveguide. The straight-through waveguide and the cross waveguide are combined into a mode multiplexing structure, the straight-through port and the cross port each include a strip-to-ridge waveguide wedge structure disposed at one end of the mode multiplexing structure, and the mode conversion structure has a bi-level taper disposed at another end of the mode multiplexing structure.

In certain embodiments, each of the at least two polarization control structures includes a polarization rotator and a polarization beam combiner.

In certain embodiments, the polarization beam combiner includes three mode conversion couplers that are the same, and each of the mode conversion couplers includes a single-mode access waveguide and a multi-mode bus waveguide. A first mode conversion coupler and a second mode conversion coupler of the three mode conversion couplers are arranged side by side, the multi-mode bus waveguide of a third mode conversion coupler is connected to the multi-mode bus waveguide of the first mode conversion coupler, and the single-mode access waveguide of the third mode conversion coupler is connected to an output end of the single-mode access waveguide of the second mode conversion coupler.

In certain embodiments, the at least one Mach-Zehnder interferometer includes a 2×2 input 3 dB coupler, two phase shift arms, and a 2×2 output 3 dB coupler that are sequentially connected to each other, and at least one of the two phase shift arms is a tunable phase shift arm. Each of the input 3 dB coupler and the output 3 dB coupler is a polarization-independent coupler, and a polarization rotator is disposed on each of the phase shift arms.

In certain embodiments, the at least one Mach-Zehnder interferometer further includes a monitor photodetector, and the monitor photodetector is optically connected to an output port of the output 3 dB coupler.

In another aspect, the present disclosure provides a silicon photonic integrated chip, which includes the above-mentioned wavelength division multiplexer.

In certain embodiments, the silicon photonic integrated chip further includes optical modulators that are disposed on the silicon substrate and optically connected to the input ports of the wavelength division multiplexer, respectively. After multiple incident optical signals are modulated by the optical modulators, multiple modulated optical signals are outputted. The multiple modulated optical signals are respectively inputted through the input ports of the at least two polarization control structures of the wavelength division multiplexer, and are outputted as the multiplexed optical signal after passing through the at least two polarization control structures and the at least one Mach-Zehnder interferometer.

Therefore, in the wavelength division multiplexer and the silicon photonic integrated chip provided by the present disclosure, the adopted polarization control structures have large bandwidths for increasing an optical bandwidth of the wavelength division multiplexer and reducing an optical loss. The quantity of the phase shift arms that require tuning feedback is reduced to lower the overall power consumption of the wavelength division multiplexer. Further, reliability and yields of the wavelength division multiplexer can be effectively enhanced due to a large manufacturing tolerance and good stability of the polarization control structures.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
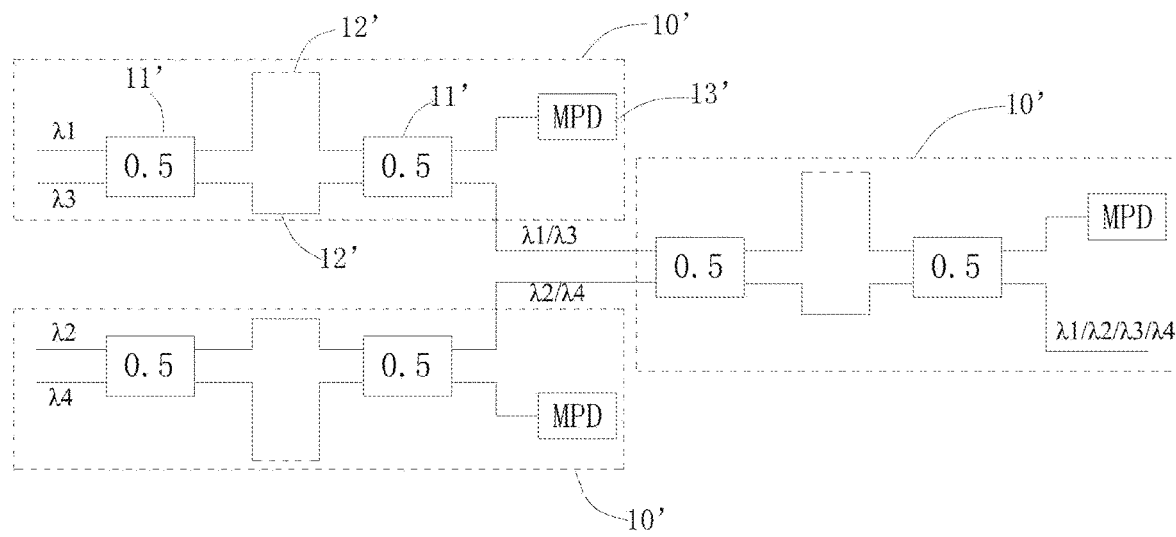
FIG. 1 is a schematic structural diagram of a conventional silicon-photonic MZI-type wavelength division multiplexer.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

In the drawings of the present disclosure, the sizes of certain structures or portions may be enlarged relative to other structures or portions for illustrative purposes, and thus are merely used for illustration of the basic structure of the subject matter of the present disclosure.

In addition, spatially relative terms (such as "over," "above," "under," and "below") in the present disclosure are used to conveniently describe a spatial relationship between one element/feature and another element/feature as shown in the drawings. These spatially relative terms are intended to include different orientations of a device in use or in operation other than the orientations illustrated in the drawings. For example, when the device in the drawing is turned over, elements described as below and/or under other elements or features would then be oriented above the other elements or features. Therefore, the exemplary term "below" encompasses both orientations of "above" and "below". The device may also be otherwise oriented (rotated 90 degrees or at other orientations), and the spatially relative terms used herein is to be interpreted accordingly. When one element/layer is referred to as being disposed "above" or "connected to" another element/layer, said element/layer can be directly disposed above or connected to another element/layer, or a middle element/layer can be provided therebetween.

First Embodiment

Figure 2:
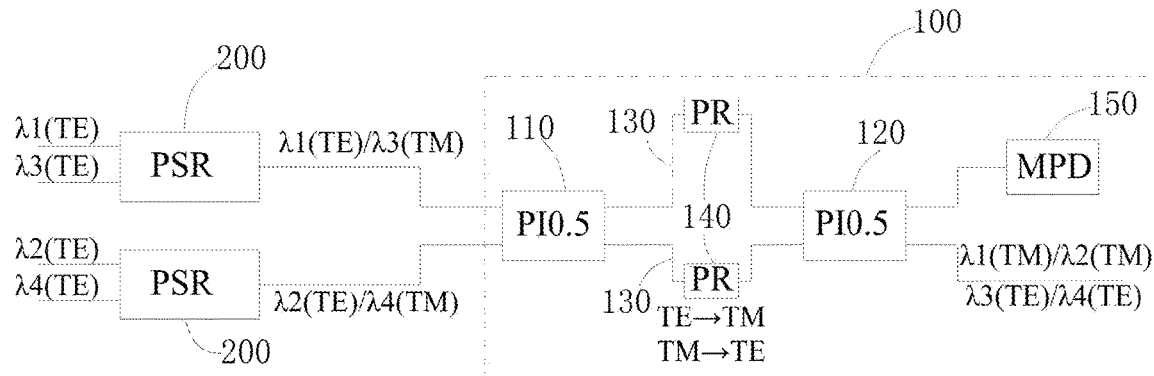
FIG. 2 is a schematic structural diagram of a wavelength division multiplexer according to a first embodiment of the present disclosure.

A wavelength division multiplexer of the present disclosure includes a silicon substrate, a buried oxide layer, a waveguide layer, and an upper cladding layer. As shown in FIG. 2, at least two polarization control structures 200 and at least one polarization-independent Mach-Zehnder interferometer 100 are disposed on the silicon substrate. The polarization control structure 200 includes two input ports and one output port, the Mach-Zehnder interferometer 100 includes two input ports and one optical signal output port, and the optical signal output port is used for outputting a multiplexed optical signal. The output ports of the polarization control structures 200 are connected to the input ports of the Mach-Zehnder interferometer 100. The polarization control structure 200 receives two linearly-polarized light beams of linearly-polarized incident light beams, all the linearly-polarized incident light beams have different wavelengths, the two linearly-polarized light beams are combined and outputted as a sub-multiplexed optical signal in which linear polarization states of the two linearly-polarized light beams are rotated to be perpendicular to each other, and the sub-multiplexed optical signal is inputted through one of the input ports of the Mach-Zehnder interferometer 100. The above-mentioned at least one polarization-independent Mach-Zehnder interferometer 100 receives the sub-multiplexed optical signals outputted by the above-mentioned at least two polarization control structures 200, and the sub-multiplexed optical signals are combined and outputted as the multiplexed optical signal which includes two linear polarization states that are perpendicular to each other. The wavelength division multiplexer adopts polarization control structures that have large bandwidths for increasing an optical bandwidth of the wavelength division multiplexer and reducing an optical loss. A quantity of phase shift arms that require tuning feedback is reduced to lower the overall power consumption of the wavelength division multiplexer. Further, reliability and yields of the wavelength division multiplexer can be effectively enhanced due to a large manufacturing tolerance and good stability of the polarization control structures.

Figure 3:
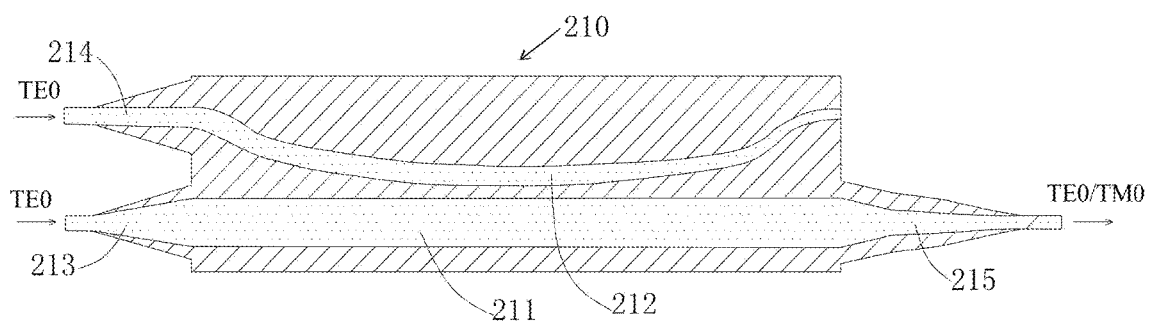
FIG. 3 is a schematic structural diagram of an integrated silicon-substrate polarization rotator-combiner according to the first embodiment of the present disclosure.
Figure 4:
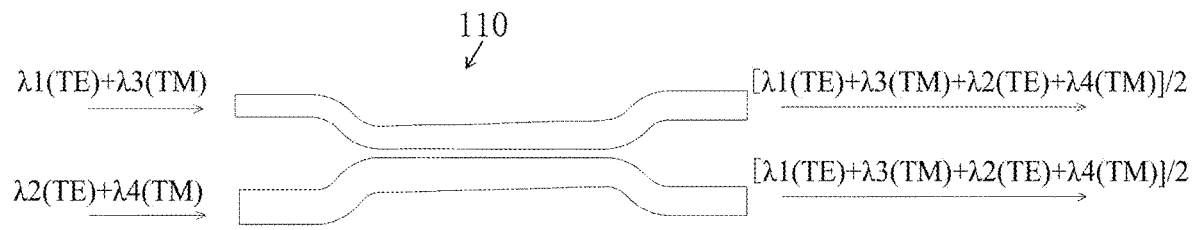
FIG. 4 is a schematic structural diagram of a polarization-independent 2×2 input 3 dB coupler.
Figure 5:
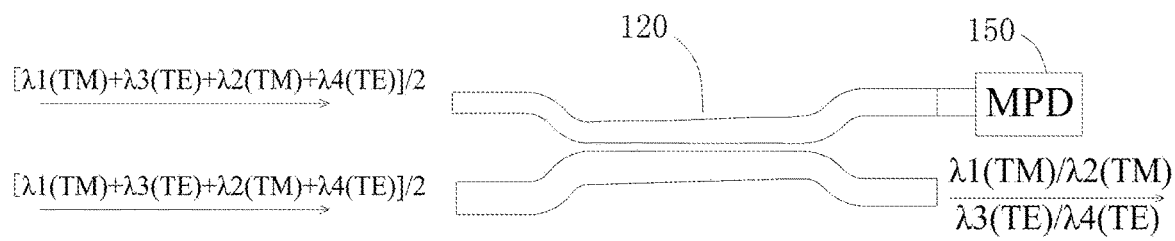
FIG. 5 is a schematic structural diagram of a polarization-independent 2×2 output 3 dB coupler.

Reference is made to FIG. 2 to FIG. 6, in which a wavelength division multiplexer of four wavelengths is taken as an example. The wavelength division multiplexer of four wavelengths includes two polarization control structures 200 that are arranged side by side and one Mach-Zehnder interferometer 100. In the present embodiment, each of the polarization control structures 200 is an integrated polarization rotator-combiner. As shown in FIG. 3, an integrated polarization rotator-combiner 210 includes a straight-through waveguide 211, a cross waveguide 212, a straight-through port 213 and a cross port 214 that are respectively connected to the straight-through waveguide 211 and the cross waveguide 212, and a mode conversion structure 215 that is connected to the straight-through waveguide 211. Here, the straight-through waveguide 211 and the cross waveguide 212 are combined into a mode multiplexing structure. The straight-through port 213 and the cross port 214 each include a strip-to-ridge waveguide wedge structure disposed at one end of the mode multiplexing structure, and are input ports of the polarization control structure. The mode conversion structure 215 has a bi-level taper disposed at another end of the mode multiplexing structure, and is used as an output port of the polarization control structure for outputting the multiplexed optical signal.

In the present embodiment, the polarization-independent Mach-Zehnder interferometer 100 includes a 2×2 input 3 dB coupler 110, two phase shift arms 130, and a 2×2 output 3 dB coupler 120 that are sequentially connected to each other. At least one of the two phase shift arms 130 is a tunable phase shift arm, and the tunable phase shift arm is indicated by broken lines in FIG. 2. Here, each of the input 3 dB coupler 110 and the output 3 dB coupler 120 is a polarization-independent (PI) 3 dB coupler (i.e., PI 0.5). A polarization rotator 140 is also disposed on the phase shift arm 130. Two ports at an input end of the input 3 dB coupler 110 are used as the input ports of the Mach-Zehnder interferometer 100. The output 3 dB coupler 120 has two ports at an output end thereof, in which one port is used as the optical signal output port of the Mach-Zehnder interferometer 100 for outputting a multiplexed optical beam, and another port is optically connected to a monitor photodetector (MPD) 150 for feeding back a tuning state of the tunable phase shift arm.

Figure 6:
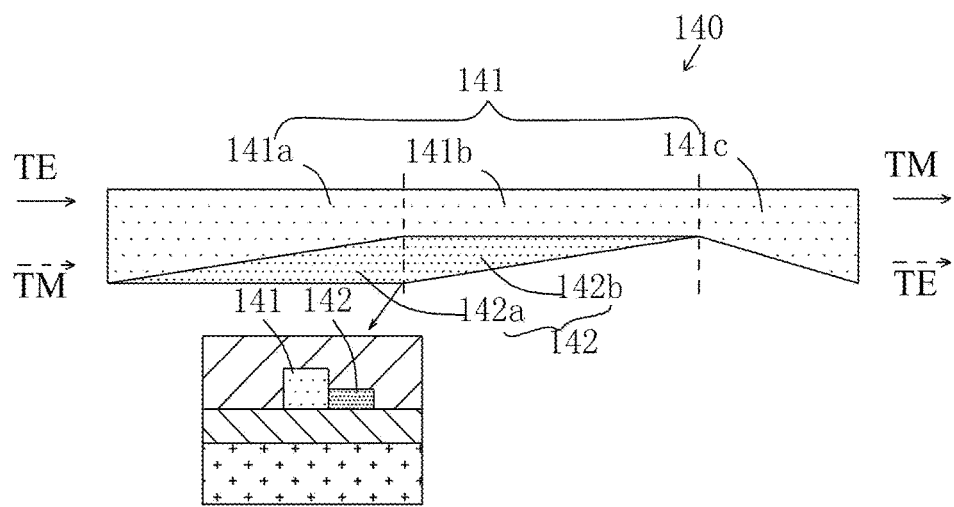
FIG. 6 is a schematic structural diagram of a polarization rotator (PR)

As shown in FIG. 6, the polarization rotator (PR) 140 includes a ridge waveguide 141 and a partial planar waveguide 142 located at a side of the ridge waveguide 141. The ridge waveguide 141 includes a first wedge structure 141a, a linear structure 141b, and a second wedge structure 141c that are sequentially connected to each other. The first wedge structure 141a is used as an input end of the polarization rotator 140, and a width thereof gradually narrows along an optical path until the first wedge structure 141a is connected to the linear structure 141b. A width of the second wedge structure 141c gradually widens along the optical path until the second wedge structure 141c is connected to an optical waveguide of the phase shift arm. The partial planar waveguide 142 has a height that is less than a height of the ridge waveguide 141, and includes a third wedge structure 142a and a fourth wedge structure 142b that are located at a same side of the ridge waveguide 141 and are connected to each other. The third wedge structure 142a is closely adjacent to a side surface of the first wedge structure 141a, the fourth wedge structure 142b is closely adjacent to a side surface of the linear structure 141b, a tip of the third wedge structure 142a is closely attached to a side surface at a wider end of the first wedge structure 141a, and a tip of the fourth wedge structure 142b is close to a narrower end of the second wedge structure 141c. A linearly-polarized light beam is incident through the wider end of the first wedge structure 141a. In the first wedge structure 141a and the linear structure 141b, the linearly-polarized light beam is distributed into the ridge waveguide 141 and the partial planar waveguide 142 in an optical mode, so that a polarization state thereof is continuously rotated with the light beam transmission. When the linearly-polarized light beam is incident to the second wedge structure 141c, a polarization direction is already rotated by 90 degrees, and then the linearly-polarized light beam is coupled into the optical waveguide of the phase shift arm through the second wedge structure 141c. In other embodiments, a polarization rotator-combiner as shown in FIG. 3 can also be used as a polarization rotator. The linearly-polarized light beam is incident from the cross port, and is coupled to the straight-through waveguide through the cross waveguide. Finally, the linearly-polarized light beam that is rotated by 90 degrees is outputted through the mode conversion structure.

During operation, optical signals of four wavelengths (i.e., $\lambda 1$, $\lambda 2$, $\lambda 3$ and $\lambda 4$) are all in a linearly-polarized TE0 mode, and the optical signals of $\lambda 1$ and $\lambda 3$ are inputted through the straight-through port 213 and the cross port 214 of one integrated polarization rotator-combiner 210, respectively. Accordingly, the optical signal of $\lambda 1$ enters into the straight-through waveguide 211, and the optical signal of $\lambda 3$ enters into the cross waveguide 212. The mode of the optical signal of $\lambda 1$ within the straight-through waveguide 211 remains unchanged, and the optical signal of $\lambda 1$ outputted through the mode conversion structure 215 is still in the TE0 mode. The optical signal of $\lambda 3$ within the cross waveguide 212 is coupled into the straight-through waveguide 211, so that the mode of the optical signal of $\lambda 3$ is changed into TE1 and mode-multiplexed with the optical signal within the straight-through waveguide 211. Then, the optical signal of $\lambda 3$ is converted to a TM0 mode through the mode conversion structure 215, and is combined with the optical signal of $\lambda 1$ in the TE0 mode (originally within the straight-through waveguide 211) mentioned above, such that one sub-multiplexed optical signal that includes $\lambda 1$ in the TE0 mode and $\lambda 3$ in the TM0 mode (TE0+TM0) is formed. Similarly, the optical signals of $\lambda 2$ and $\lambda 4$ are inputted into the straight-through port 213 and the cross port 214 of another integrated polarization rotator-combiner 210, respectively. Accordingly, the optical signal of $\lambda 2$ enters into the straight-through waveguide 211, and the optical signal of $\lambda 4$ enters into the cross waveguide 212. Eventually, one sub-multiplexed optical signal that includes $\lambda 2$ in the TE0 mode and $\lambda 4$ in the TM0 mode is outputted through the mode conversion structure 215. These two sub-multiplexed optical signals (i.e., $\lambda 1$ (TE0)+$\lambda 3$ (TM0) and $\lambda 2$ (TE0)+$\lambda 4$ (TM0)) are inputted through the two input ports of the polarization-independent 2×2 input 3 dB coupler 110 of the Mach-Zehnder interferometer 100, respectively. $\lambda 1$ (TE0), $\lambda 2$ (TE0), $\lambda 3$ (TM0) and $\lambda 4$ (TM0) are each transmitted through the two phase shift arms 130 at half optical power. The polarization direction of light of each wavelength is rotated by 90 degrees through the polarization rotator 140 in the phase shift arm 130. Then, a polarization state of the light of each wavelength is changed into: $\lambda 1$ (TM0), $\lambda 2$ (TM0), $\lambda 3$ (TE0) and $\lambda 4$ (TE0). Through tuning the tunable phase shift arm to control the phase shifting of the optical signals in the TE mode and the TM mode, and through cooperation of the two polarization rotators 140 in the two phase shift arms 130 to rotate the polarization direction of the optical signals (for controlling a phase difference between the optical signals in the TE mode and a phase difference between the optical signals in the TM mode to be roughly equal), the optical signals in the two phase shift arms 130 can be outputted through the same one of the two ports of the polarization-independent output 3 dB coupler 120, and the optical power detected by the monitor photodetector 150 disposed at another one of the two ports approaches zero. That is, one port of the 2×2 output 3 dB coupler 120 of the Mach-Zehnder interferometer 100 outputs the multiplexed optical signal of $\lambda 1$ (TM0), $\lambda 2$ (TM0), (TE0) and $\lambda 4$ (TE0). When the tunable phase shift arm is being tuned, the monitor photodetector 150 can be used to monitor the optical power at another output port of the output 3 dB coupler 120 until the optical power at said output port is zero (or approaches zero) or a minimum value. When an output light beam cannot be completely combined and outputted with another light beam due to a phase of the output light beam being affected by the surroundings or other factors, a monitor photodetector may detect an increase of the optical power and feed this information back to a controller. Then the controller will control the tunable phase shift arm to tune the phase until the optical power detected by the monitor photodetector approaches zero or the minimum value again.

The wavelength division multiplexer of four wavelengths adopts two passive polarization control structures that are configured with large bandwidths. Accordingly, a quantity of 3 dB couplers in the wavelength division multiplexer is reduced, a bandwidth limitation of the wavelength division multiplexer by the 3 dB couplers can be reduced, the optical bandwidth of the wavelength division multiplexer can be increased, and the optical loss can be reduced. During the operation process, the four-wavelength wavelength division multiplexing can be realized by only tuning one phase shift arm. Since there are fewer phase shift arms that require tuning feedback, the overall power consumption of the device is reduced. Further, the reliability and the yields of the wavelength division multiplexer can be effectively enhanced due to a large manufacturing tolerance and good stability of the polarization control structures.

Second Embodiment

Figure 7:
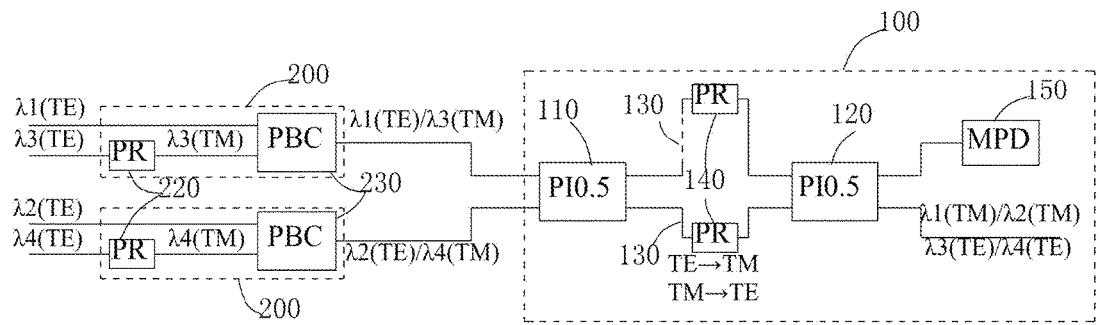
FIG. 7 is a schematic structural diagram of the wavelength division multiplexer according to a second embodiment of the present disclosure.
Figure 8:
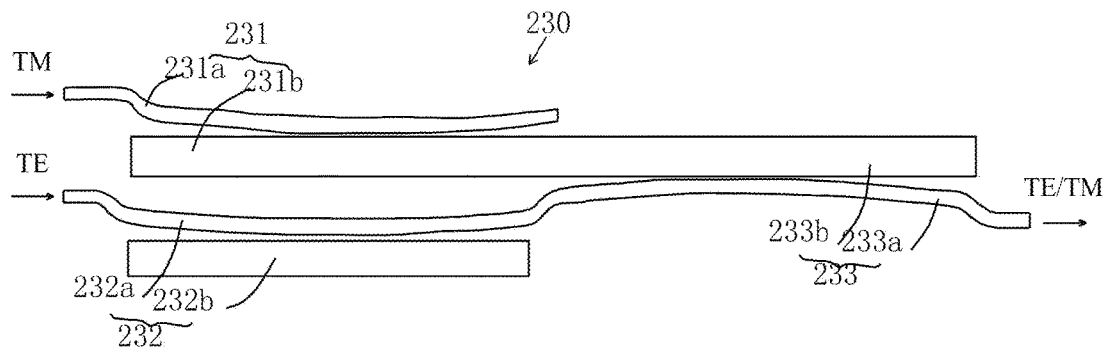
FIG. 8 is a schematic structural diagram of a polarization beam combiner (PBC)

In contrast to the first embodiment, the polarization control structure 200 of the present embodiment (as shown in FIG. 7 and FIG. 8) includes a polarization rotator (PR) 220 and a polarization beam combiner (PBC) 230. In this embodiment, the polarization rotator 220 adopts the structure as shown in FIG. 6 (which is similar to that of the polarization rotator of the first embodiment), and includes a ridge waveguide and a partial planar waveguide located at a side of the ridge waveguide, details of which will not be reiterated herein. In other embodiments, the polarization rotator-combiner as shown in FIG. 3 can also be used as the polarization rotator. The linearly-polarized light beam is incident from the cross port, and is coupled to the straight-through waveguide through the cross waveguide. Finally, the linearly-polarized light beam that is rotated by 90 degrees is outputted through the mode conversion structure.

As shown in FIG. 8, the above-mentioned polarization beam combiner 230 includes three mode conversion couplers (i.e., a first mode conversion coupler 231, a second mode conversion coupler 232, and a third mode conversion coupler 233) that are the same, and each of the mode conversion couplers includes a single-mode access waveguide and a multi-mode bus waveguide. The first mode conversion coupler 231 and the second mode conversion coupler 232 are arranged side by side, and are disposed at an input end of the polarization beam combiner 230. A single-mode access waveguide 231a of the first mode conversion coupler 231 and a single-mode access waveguide 232a of the second mode conversion coupler 232 are connected to an output port of the polarization rotator and an input port of the wavelength division multiplexer, respectively. The third mode conversion coupler 233 is connected in cascade with the above-mentioned first mode conversion coupler 231 and second mode conversion coupler 232. A multi-mode bus waveguide 233b of the third mode conversion coupler 233 is connected to an output end of a multi-mode bus waveguide 231b of the first mode conversion coupler 231, and a single-mode access waveguide 233a of the third mode conversion coupler 233 is connected to an output end of the single-mode access waveguide 232a of the second mode conversion coupler 232.

The wavelength division multiplexer of four wavelengths is taken as an example. During operation, the optical signals of the four wavelengths (i.e., $\lambda 1$, $\lambda 2$, $\lambda 3$ and $\lambda 4$) are all in the linearly-polarized TE mode, and the optical signals of $\lambda 1$ and $\lambda 3$ are respectively inputted into the two input ports of one of the polarization control structures 200. While the optical signal of $\lambda 1$ is directly incident into the polarization beam combiner 230, through the above-mentioned single-mode access waveguide 231a of the first mode conversion coupler 231, the optical signal of $\lambda 3$ is incident into the polarization beam combiner 230 after being rotated by 90 degrees through the polarization rotator 220 and converted into the linearly-polarized light beam that is in the TM mode. That is, the optical signal of $\lambda 3$ is first incident into a polarization rotator and converted into the linearly-polarized light beam that is in the TM mode through the polarization rotator, and then is incident into the polarization beam combiner 230 through the above-mentioned single-mode access waveguide 232a of the second mode conversion coupler 232. Through the polarization beam combiner 230, $\lambda 1$ in the TE mode and $\lambda 3$ in the TM mode are combined and outputted as the sub-multiplexed optical signal of $\lambda 1$ (TE) and $\lambda 3$ (TM). Similarly, the optical signals of $\lambda 2$ and $\lambda 4$ are respectively inputted into the two input ports of another one of the polarization control structures 200. While the optical signal of $\lambda 2$ is directly incident into the polarization beam combiner 230, the optical signal of $\lambda 4$ is incident into the polarization beam combiner 230 after being rotated by 90 degrees through the polarization rotator 220 and converted into the linearly-polarized light beam that is in the TM mode. Through the polarization beam combiner 230, $\lambda 2$ in the TE mode and $\lambda 4$ in the TM mode are combined and outputted as the sub-multiplexed optical signal of $\lambda 2$ (TE) and $\lambda 4$ (TM). These two sub-multiplexed optical signals (i.e., $\lambda 1$ (TE0)+$\lambda 3$ (TM0) and $\lambda 2$ (TE0)+$\lambda 4$ (TM0)) are inputted through the two input ports of the polarization-independent 2×2 input 3 dB coupler 110 of the Mach-Zehnder interferometer 100, respectively. $\lambda 1$ (TE0), $\lambda 2$ (TE0), $\lambda 3$ (TM0) and $\lambda 4$ (TM0) are each transmitted through the two phase shift arms 130 at half the optical power. The polarization direction of the light of each wavelength is rotated by 90 degrees through the polarization rotator 140 in the phase shift arm 130. Then, the polarization state of the light of each wavelength is changed into: $\lambda 1$ (TM0), $\lambda 2$ (TM0), $\lambda 3$ (TE0) and $\lambda 4$ (TE0). Through tuning the tunable phase shift arm to control the phase shifting of the optical signals in the TE mode and the TM mode, and through cooperation of the two polarization rotators 140 in the two phase shift arms 130 to rotate the polarization direction of the optical signals (for controlling the phase difference between the optical signals in the TE mode and the phase difference between the optical signals in the TM mode to be roughly equal), the optical signals in the two phase shift arms 130 can be outputted through the same one of the two ports of the polarization-independent output 3 dB coupler 120, and the optical power detected by the monitor photodetector 150 disposed at another one of the two ports approaches zero or the minimum value. That is, one port of the 2×2 output 3 dB coupler 120 of the Mach-Zehnder interferometer 100 outputs the multiplexed optical signal of $\lambda 1$ (TM0), $\lambda 2$ (TM0), $\lambda 3$ (TE0) and $\lambda 4$ (TE0).

In the present embodiment, the polarization beam combiner that includes the three mode conversion couplers is combined with the polarization rotator for performing polarization beam combining on two incident optical signals that have the same linear polarization state. In this way, crosstalk can be reduced. In addition, since the mode conversion coupler has characteristics of a low loss and a large bandwidth, the optical loss can be further reduced, and the optical bandwidth of the device can be increased.

Figure 9:
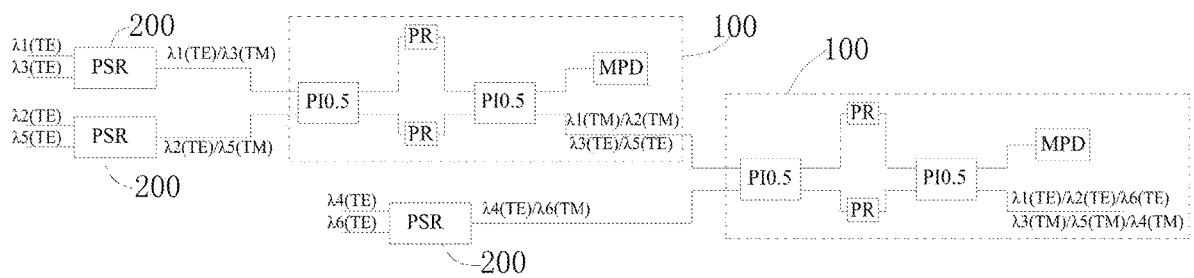
FIG. 9 is a schematic structural diagram illustrating one expansion of the wavelength division multiplexer according to the present disclosure.
Figure 10:
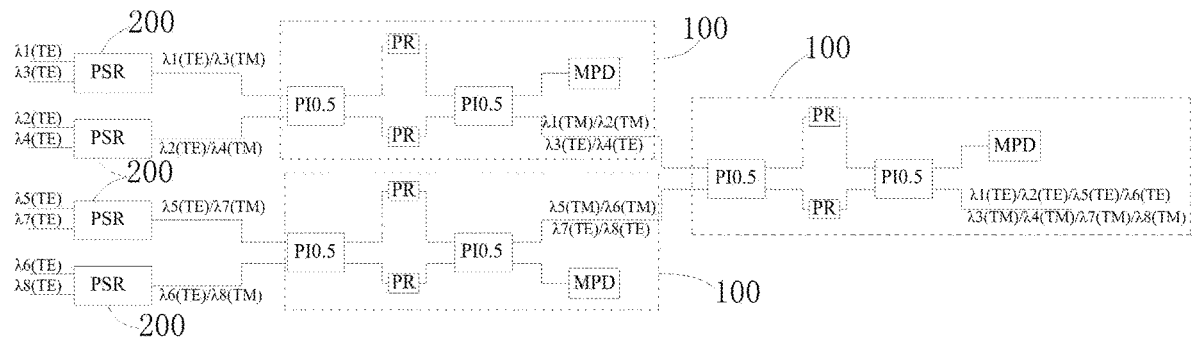
FIG. 10 is a schematic structural diagram illustrating another expansion of the wavelength division multiplexer according to the present disclosure.

The four-wavelength wavelength division multiplexing is exemplified in the above-mentioned first and second embodiments for illustrative purposes. In other embodiments, the wavelength division multiplexer can also be used for wavelength division multiplexing of other multiple wavelengths. To this end, the polarization control structures are arranged to correspond in quantity to multiplexed wavelength channels for connecting in parallel and in cascade with the Mach-Zehnder interferometers. That is, the polarization control structures included in the wavelength division multiplexer are n in number, the polarization-independent Mach-Zehnder interferometers included in the wavelength division multiplexer are n−1 in number, and n is an integer that is greater than or equal to 2. When n is 2, the wavelength division multiplexer is the above-mentioned wavelength division multiplexer of four wavelengths. When n is 3, the wavelength division multiplexer is expanded into a wavelength division multiplexer of six wavelength channels (as shown in FIG. 9). When n is 4, the wavelength division multiplexer is expanded into a wavelength division multiplexer of eight wavelength channels (as shown in FIG. 10). Naturally, more expansions can also be produced in a similar manner.

Third Embodiment

Figure 11:
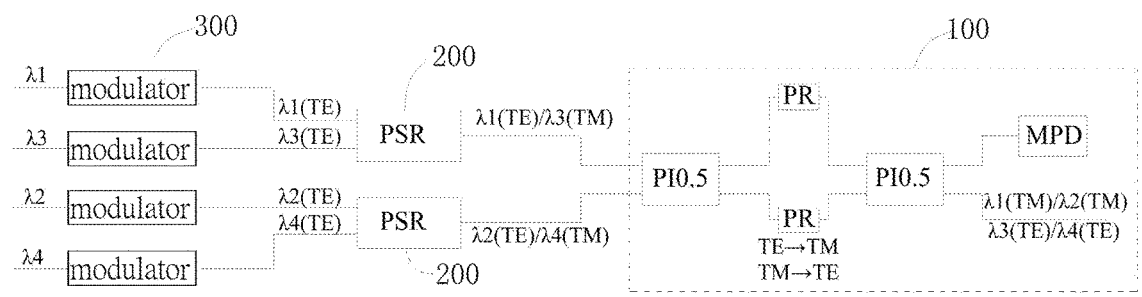
FIG. 11 is a schematic diagram of a silicon photonic integrated chip according to a third embodiment of the present disclosure.

Referring to FIG. 11, the present embodiment provides a silicon photonic integrated chip, which includes optical modulators 300 and the wavelength division multiplexer mentioned in any of the previous embodiments. The optical modulators 300 are disposed on the silicon substrate, and are optically connected to the input ports of the wavelength division multiplexer, respectively. After multiple incident optical signals are modulated by the optical modulators 300, multiple modulated optical signals are outputted. The multiple modulated optical signals are respectively inputted through the input ports of the wavelength division multiplexer, and are multiplexed by the polarization control structures 200 and the Mach-Zehnder interferometer 100, so as to output the multiplexed optical signal. The silicon photonic integrated chip is integrated with the wavelength division multiplexer mentioned in any of the previous embodiments to perform wavelength division multiplexing. Accordingly, the power consumption of the device can be effectively reduced, the optical bandwidth can be increased, and reliability and yields of a product can be enhanced.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A wavelength division multiplexer, comprising:

at least two polarization control structures and at least one polarization-independent Mach-Zehnder interferometer that are disposed on a silicon substrate;

wherein each of the at least two polarization control structures includes two input ports and one output port, the at least one Mach-Zehnder interferometer includes two input ports and one optical signal output port, the optical signal output port is used for outputting a multiplexed optical signal, and the output ports of the at least two polarization control structures are connected to the input ports of the at least one Mach-Zehnder interferometer;

wherein each of the at least two polarization control structures receives two linearly-polarized light beams of linearly-polarized incident light beams, all the linearly-polarized incident light beams have different wavelengths, the two linearly-polarized light beams are combined and outputted as a sub-multiplexed optical signal in which linear polarization states of the two linearly-polarized light beams are rotated to be perpendicular to each other, and the sub-multiplexed optical signal is inputted through one of the input ports of the at least one Mach-Zehnder interferometer; wherein the at least one polarization-independent Mach-Zehnder interferometer receives the sub-multiplexed optical signals outputted by the at least two polarization control structures, and the sub-multiplexed optical signals are combined and outputted as the multiplexed optical signal which includes two linear polarization states that are perpendicular to each other.

2. The wavelength division multiplexer according to claim 1, wherein the at least two polarization control structures included in the wavelength division multiplexer are n in number, the at least one polarization-independent Mach-Zehnder interferometer included in the wavelength division multiplexer is n−1 in number, and n is an integer that is greater than or equal to 2.

3. The wavelength division multiplexer according to claim 1, wherein each of the at least two polarization control structures is an integrated polarization rotator-combiner.

4. The wavelength division multiplexer according to claim 3, wherein the integrated polarization rotator-combiner includes a straight-through waveguide, a cross waveguide, a straight-through port and a cross port that are respectively connected to the straight-through waveguide and the cross waveguide, and a mode conversion structure that is connected to the straight-through waveguide; wherein the straight-through waveguide and the cross waveguide are combined into a mode multiplexing structure, the straight-through port and the cross port each include a strip-to-ridge waveguide wedge structure disposed at one end of the mode multiplexing structure, and the mode conversion structure has a bi-level taper disposed at another end of the mode multiplexing structure.

5. The wavelength division multiplexer according to claim 1, wherein each of the at least two polarization control structures includes a polarization rotator and a polarization beam combiner.

6. The wavelength division multiplexer according to claim 5, wherein the polarization beam combiner includes three mode conversion couplers that are the same, and each of the mode conversion couplers includes a single-mode access waveguide and a multi-mode bus waveguide; wherein a first mode conversion coupler and a second mode conversion coupler of the three mode conversion couplers are arranged side by side, the multi-mode bus waveguide of a third mode conversion coupler is connected to the multi-mode bus waveguide of the first mode conversion coupler, and the single-mode access waveguide of the third mode conversion coupler is connected to an output end of the single-mode access waveguide of the second mode conversion coupler.

7. The wavelength division multiplexer according to claim 1, wherein the at least one Mach-Zehnder interferometer includes a 2×2 input 3 dB coupler, two phase shift arms, and a 2×2 output 3 dB coupler that are sequentially connected to each other, and at least one of the two phase shift arms is a tunable phase shift arm; wherein each of the input 3 dB coupler and the output 3 dB coupler is a polarization-independent coupler, and a polarization rotator is disposed on each of the phase shift arms.

8. The wavelength division multiplexer according to claim 7, wherein the at least one Mach-Zehnder interferometer further includes a monitor photodetector, and the monitor photodetector is optically connected to an output port of the output 3 dB coupler.

9. A silicon photonic integrated chip, comprising the wavelength division multiplexer as claimed in claim 1.

10. The silicon photonic integrated chip according to claim 9, further comprising optical modulators that are disposed on the silicon substrate and optically connected to the input ports of the wavelength division multiplexer, respectively; wherein, after multiple incident optical signals are modulated by the optical modulators, multiple modulated optical signals are outputted; wherein the multiple modulated optical signals are respectively inputted through the input ports of the at least two polarization control structures of the wavelength division multiplexer, and are outputted as the multiplexed optical signal after passing through the at least two polarization control structures and the at least one Mach-Zehnder interferometer.

* * * * *